(12) United States Patent
Wang et al.

(10) Patent No.: US 9,686,506 B2
(45) Date of Patent: Jun. 20, 2017

(54) METHOD, APPARATUS, SYSTEM, AND STORAGE MEDIUM FOR VIDEO CALL AND VIDEO CALL CONTROL

(71) Applicant: TENCENT TECHNOLOGY (SHENZHEN) COMPANY LIMITED, Shenzhen (CN)

(72) Inventors: Fei Wang, Shenzhen (CN); Qing Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/682,450

(22) Filed: Apr. 9, 2015

(65) Prior Publication Data
US 2015/0215579 A1 Jul. 30, 2015

Related U.S. Application Data

(63) Continuation of application No. PCT/CN2013/084001, filed on Sep. 23, 2013.

(30) Foreign Application Priority Data

Oct. 19, 2012 (CN) .......................... 2012 1 0400705

(51) Int. Cl.
*H04N 7/15* (2006.01)
*H04N 7/14* (2006.01)

(52) U.S. Cl.
CPC .................................. *H04N 7/147* (2013.01)

(58) Field of Classification Search
None
See application file for complete search history.

(56) References Cited

U.S. PATENT DOCUMENTS 6,065,084 A * 5/2000 Chatzigianis ....... G06F 13/4013
710/307
8,164,655 B2 * 4/2012 Lablans ................. H04N 5/775
348/143

(Continued)

FOREIGN PATENT DOCUMENTS

| CN | 101170605 A | 4/2008 |
| CN | 101626550 A | 1/2010 |

(Continued)

OTHER PUBLICATIONS

The World Intellectual Property Organization (WIPO) International Search Report for PCT/CN2013/084001 Jan. 2, 2014.

(Continued)

*Primary Examiner* — Creighton Smith
(74) *Attorney, Agent, or Firm* — Anova Law Group, PLLC

(57) ABSTRACT

The present disclosure provides a video call method, including: sending, by a first video terminal associated with a first account, a video call connection request to a video call control apparatus, to request to establish a video call connection with a second video terminal associated with a second account; receiving, by the first video terminal, video call preview information of the second account returned by the video call control apparatus; and displaying, in a video call interface of the first video terminal, the video call preview information of the second account, while the video call connection is being established. As such, video call preview information of a user may be displayed in advance when establishing a video call connection. The present disclosure further provides a video call apparatus, a video call control method and apparatus, a video call system, and a storage medium.

19 Claims, 6 Drawing Sheets

(56) References Cited

U.S. PATENT DOCUMENTS

| | | | |
|---|---|---|---|
| 8,831,191 B1* | 9/2014 | Vendrow | H04M 3/42042 379/142.01 |
| 9,203,964 B1* | 12/2015 | Neuer, III | H04M 3/5175 |
| 2002/0097856 A1 | 7/2002 | Wullert | |
| 2005/0012824 A1* | 1/2005 | Stavely | H04N 5/23216 348/211.99 |
| 2009/0285550 A1* | 11/2009 | Yamada | G11B 20/00086 386/248 |
| 2010/0099448 A1 | 4/2010 | Yim et al. | |
| 2014/0025737 A1* | 1/2014 | Kruglick | H04L 67/22 709/204 |
| 2014/0082622 A1* | 3/2014 | Yang | G06F 9/445 718/100 |
| 2016/0142500 A1* | 5/2016 | Kruglick | H04L 67/22 709/204 |

FOREIGN PATENT DOCUMENTS

| | | |
|---|---|---|
| CN | 101635772 A | 1/2010 |
| JP | 2008288974 A | 11/2008 |

OTHER PUBLICATIONS

The State Intellectual Property Office of the People's Republic of China (SIPO) Office Action 1 for 201210400705.3 Jan. 28, 2016.

* cited by examiner

METHOD, APPARATUS, SYSTEM, AND STORAGE MEDIUM FOR VIDEO CALL AND VIDEO CALL CONTROL

This patent application is a continuation of PCT Application No. PCT/CN2013/084001, filed on Sep. 23, 2013, which claims priority to Chinese Patent Application No. 201210400705.3, the entire contents of all of which are incorporated herein by reference in their entirety.

FIELD OF THE TECHNOLOGY

The present disclosure generally relates to video call technologies, and more particularly, relates to a video call method and apparatus, a video call control method, a video call control apparatus, a video call system, and a video call storage medium.

BACKGROUND OF THE DISCLOSURE

As computer technologies become increasingly developed, existing communication manners such as voice calls and short message service messages can no longer satisfy users' requirements, chat services such as video chat and voice chat become increasingly popular. An increasing number of Internet products start to improve user experience thereof, and make the products have higher user stickiness. In conventional chat services such as video chat and voice chat, a chat connection such as a video connection needs to be established first. However, in a process of establishing a video connection, a user is usually required to face a boring wait, which adversely affects user experience of video chat.

Therefore, there is a need to solve technical problems in the video call technology to provide methods, apparatus, and systems for a video call.

SUMMARY

In view of the above, it is necessary to provide a video call method and apparatus, a video call control method, and a video call control apparatus to effectively improve a success rate of establishing a video connection.

A video call method includes: sending, by a first video terminal associated with a first account, a video call connection request to a video call control apparatus, so as to request to establish a video call connection with a second video terminal associated with a second account; receiving, by the first video terminal, video call preview information of the second account returned by the video call control apparatus; and displaying, in a video call interface of the first video terminal, the video call preview information of the second account, while the video call connection is being established.

A video call apparatus includes: a video call module, configured to send a video call connection request to a video call control apparatus, so as to request to establish a video call connection with a second video terminal associated with a second account; a preview information transceiver module, configured to receive video call preview information of the second account returned by the video call control apparatus; and a display module, configured to display, in a video call interface, the video call preview information of the second account, while the video call connection is being established.

A video call control method includes: receiving a video call connection request of a first video terminal associated with a first account, and forwarding the video call connection request to a second video terminal associated with a second account; determining whether video call preview information of the first account exists; and forwarding, if it is determined that the video call preview information of the first video terminal of the first account exists, the video call preview information of the first video terminal of the first account to the second video terminal.

A video call control apparatus includes: a video call control module, configured to receive a video call connection request of a first video terminal associated with a first account, and forward the video call connection request to a second video terminal associated with a second account; a preview information query module, configured to query whether video call preview information of the first account exists; and a preview information transceiver module, configured to forward, if it is determined that the video call preview information of the first account exists, the video call preview information of the first account to the second account.

A video call system includes: a video call apparatus and a video call control apparatus. The video call apparatus is configured to: enable a first video terminal associated with a first account to send a video call connection request to the video call control apparatus, so as to request to establish a video call connection with a second video terminal associated with a second account; enable the first video terminal to receive video call preview information of the second account returned by the video call control apparatus; and display, in a video call interface of the first video terminal, the video call preview information of the second account, while the video call connection is being established. The video call control apparatus is configured to: receive the video call connection request of the first video terminal associated with the first account, and forward the video call connection request to the second video terminal associated with the second account; determine whether video call preview information of the first account exists; and forward, if it is determined that the video call preview information of the first account exists, the video call preview information of the first account to the second video terminal.

One or more non-transitory computer-readable storage media including a computer-executable instruction are provided, the computer-executable instruction being used for executing a video call method. The method includes sending, by a first video terminal associated with a first account, a video call connection request to a video call control apparatus, so as to request to establish a video call connection with a second video terminal associated with a second account; receiving, by the first video terminal, video call preview information of the second account returned by the video call control apparatus; and displaying, in a video call interface of the first video terminal, the video call preview information of the second account, while the video call connection is being established.

One or more non-transitory computer-readable storage media including a computer-executable instruction are provided, the computer-executable instruction being used for executing a video call control method. The method includes receiving a video call connection request of a first video terminal associated with a first account, and forwarding the video call connection request to a second video terminal associated with a second account; determining whether video call preview information of the first account exists; and forwarding, if it is determined that the video call preview information of the first account exists, the video call preview information of the first account to the second video terminal.

By using the disclosed video call method and apparatus, the control video call method, the video call control apparatus, the video call system, and the video call storage medium, video call preview information of a user may be displayed in advance in a process of establishing a video call connection, which helps both parties of a video call to know more about each other, thereby effectively improving a probability of more successfully establishing the video call connection.

To make the foregoing and other objectives, features, and advantages of the present disclosure clearer and more comprehensible, detailed description is given below with reference to preferred embodiments and the accompanying drawings.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DESCRIPTION OF EMBODIMENTS

To further explain the technical means used in the present disclosure for achieving the intended objectives and the efficacy thereof, specific implementation manners, structures, features, and efficacy of a video call method and apparatus, a control method, and a control apparatus provided by the present disclosure are described in detail below with reference to the accompanying drawings and preferred embodiments.

A first exemplary embodiment provides a video call method, and the video call method is implemented through a video call application (referred to as a video terminal below) installed on a smart host such as a computer, a mobile phone, and a tablet computer. The video terminal not only may be a standalone video call application, but also may be a video call function module built in other instant messaging software.

Figure 1:
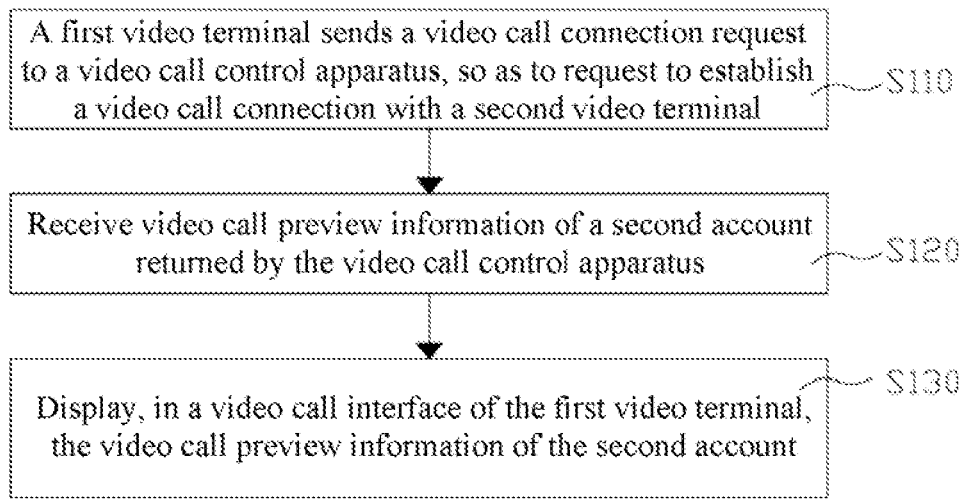
FIG. 1 is a flowchart of a video call method provided by a first exemplary embodiment.

FIG. 1 illustrates an exemplary video call method consistent with various disclosed embodiments.

Step S110. A first video terminal sends a video call connection request to a video call control apparatus, so as to request to establish a video call connection with a second video terminal.

A video call control apparatus may be, for example, a video call server. The video call server is responsible for maintaining user data, where the user data includes information essential for establishing a network connection, for example, a current IP address and a current network port number of a user account. The video call connection request may be based on various existing video call protocols, and details are not described herein again. The first video terminal may be, for example, associated with a first account, and in other words, a user logs in, on the first video terminal by using the first account, to the video call control apparatus. The second video terminal may be, for example, associated with a second account, that is, a user logs in, on the second video terminal by using the second account, to the video call control apparatus.

It can be understood by a person skilled in the art that, the first video terminal and the second video terminal may run in a same host, or may run separately in different hosts. In addition, the first video terminal and the second video terminal may be different video call applications, or may be different instances of a same video call application.

Step S120. The first video terminal receives video call preview information of a second account returned by the video call control apparatus.

It can be understood that, after receiving the video call connection request initiated by the first video terminal, the video call control apparatus queries whether a requested party, that is, the second account, has pre-stored video call preview information. The video call preview information of the second account may be pre-stored in a cloud storage server. The video call preview information may include, for example, a piece of text, an image, audio, a video or a combination thereof. After the video call preview information of the second account is found, the video call preview information of the second account may be returned to the first video terminal, and correspondingly, the first video terminal performs Step S120 in the foregoing.

Step S130. The video call preview information of the second account is displayed in a video call interface of the first video terminal, while the video call connection is being established (or before the video call connection has been established). Specifically, the video call preview information of the second account received in Step S120 may be parsed and is then displayed in the video call interface.

Step S140. After the video call connection between the first video terminal and the second video terminal is completed, step S110, step S120, and step S130 are terminated. For example, the display of the video call preview information of the second account in the video call interface of the first video terminal is terminated after the video call connection between the first video terminal and the second video terminal is completed.

In the video call method in this embodiment, in a process of establishing a video call connection, video call preview information pre-stored by a second account may be displayed in advance, so that another user knows more about personality and interests of a user of the second account, thereby facilitating a more successful video call.

Figure 2:
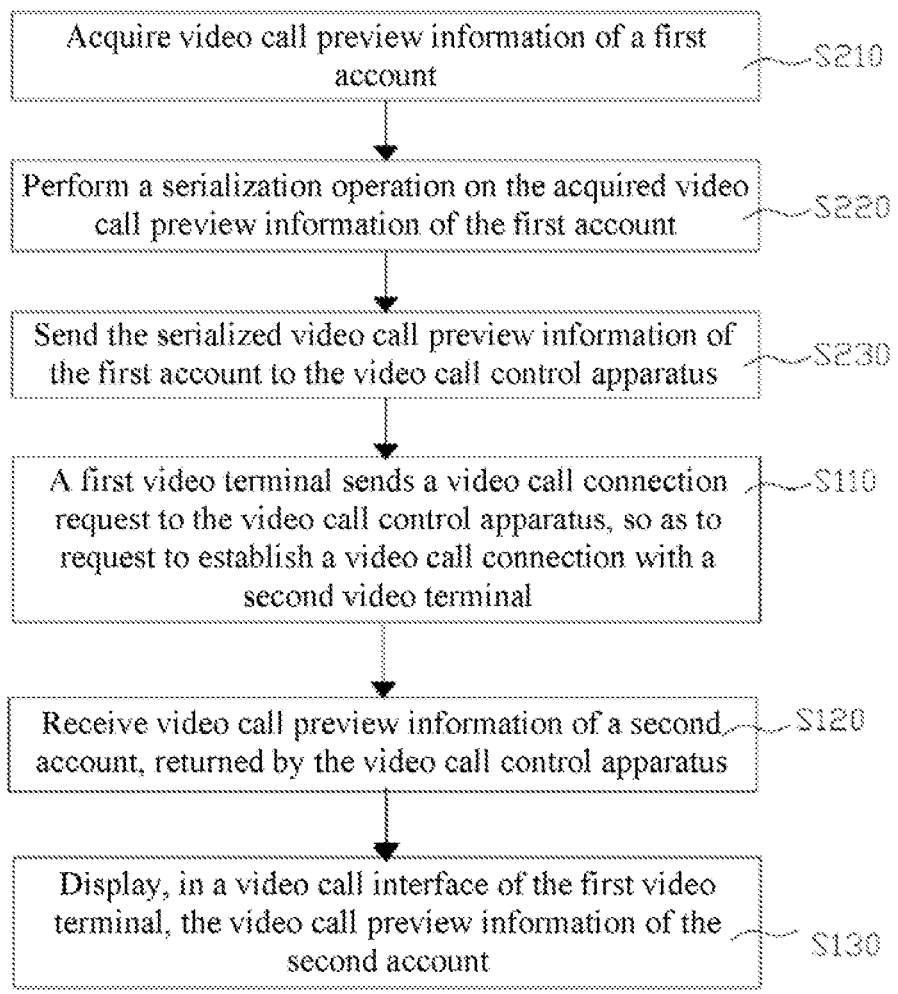
FIG. 2 is a flowchart of a video call method provided by a second exemplary embodiment.

A second embodiment provides another exemplary video call method as illustrated in FIG. 2, which is similar to the video call method in the first embodiment except that the method in FIG. 2 further includes the following exemplary steps.

Step S210. Video call preview information of a first account is acquired. Step S210 may be performed each time before a video call connection is established. Alternatively, after acquisition in step S210 is performed once previously, the video call preview information acquired at a first time or previously is directly used. For example, in a default situation, historical data of a previous time is directly used, unless a user actively changes video call preview information.

The video call preview information of the first account may also include text, an image, audio, a video or a combination thereof. Based on different preview information, manners of acquiring the preview information are also different. For example, text may be input by a user whereas for an image, audio, and a video, content stored in a host where the first video terminal runs, content stored in a network, or content obtained through real-time recording with a camera or a microphone may be directly used.

Step S220. A serialization operation is performed on the acquired video call preview information of the first account. It can be understood that, for transmission in a network, the serialization operation needs to be performed on the acquired video call preview information of the first account first account according to a requirement of network transmission.

Step S230. The serialized video call preview information of the first account is sent to the video call control apparatus.

It may be understood that, if the video call control apparatus does not save the video call preview information of the first account, it is required to send the video call preview information of the first account to the video call control apparatus each time a video call connection is established, or otherwise, the video call preview information of the first account does not need to be transmitted repeatedly. In addition, if the video call preview information is acquired again in Step S210, both Step S220 and Step S230 need to be performed, regardless of whether the video call control apparatus stores the video call preview information of the first account.

In the video call method in this embodiment, video call preview information of a first account is further acquired and sent to a video call control apparatus, and the video call control apparatus forwards the video call preview information of the first account to a second account, so that another user knows more about personality and interests of a user of the first account, thereby facilitating a more successful video call.

A third embodiment provides an exemplary video call apparatus. In a specific implementation, the video call apparatus in this embodiment may be, for example, any electronic terminal in which a video call application may run, for example, a computer, a smartphone, and a tablet computer.

Figure 3:
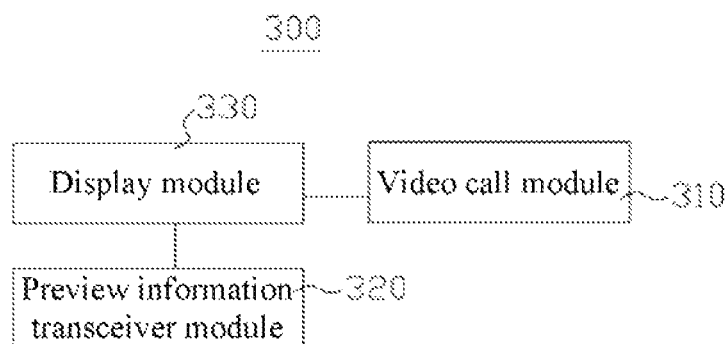
FIG. 3 is a flowchart of a video call apparatus provided by a third exemplary embodiment.

Referring to FIG. 3, a video call apparatus 300 includes a video call module 310, a preview information transceiver module 320, and a display module 330.

The video call module 310 is configured to send a video call connection request to a video call control apparatus, so as to request to establish a video call connection with a second video terminal; the preview information transceiver module 320 is configured to receive video call preview information of a second account returned by the video call control apparatus; and the display module 330 is configured to display, in a video call interface, the video call preview information of the second account.

For other details about the video call apparatus 300, reference may be further made to FIG. 1 and related description.

In the video call apparatus in this embodiment, in a process of establishing a video call connection, video call preview information pre-stored by a second account may be displayed in advance, so that another user knows more about personality and interests of a user of the second account, thereby facilitating a more successful video call.

Figure 4:
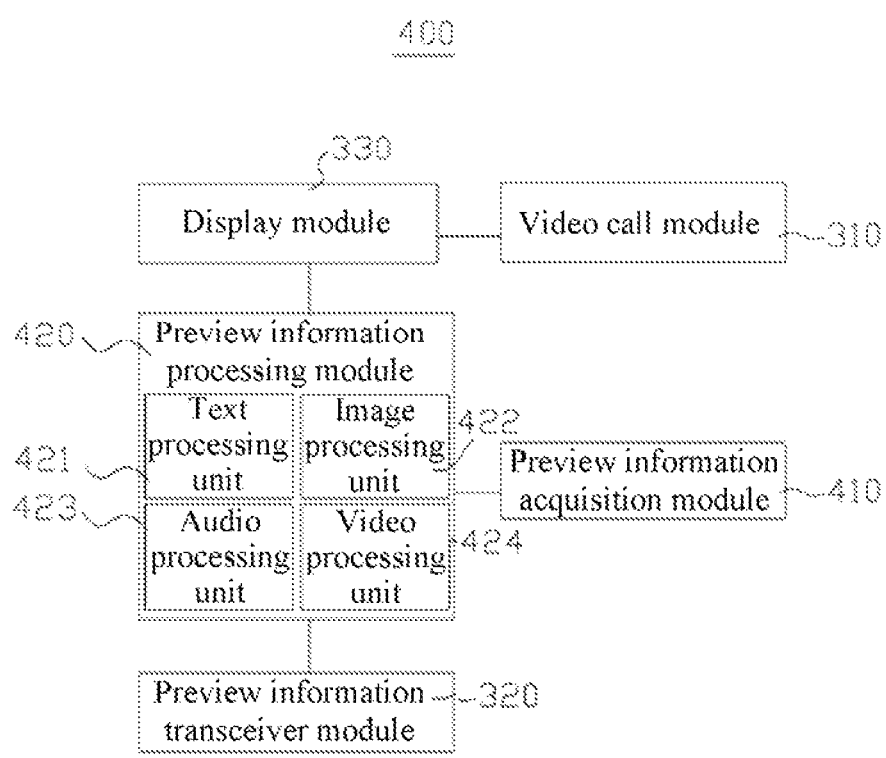
FIG. 4 is a flowchart of a video call apparatus provided by a fourth exemplary embodiment.

A fourth embodiment provides an exemplary video call apparatus as shown in FIG. 4, which is similar to the video call apparatus in the third embodiment as shown in FIG. 3, except that a video call apparatus 400 further includes: a preview information acquisition module 410 and a preview information processing module 420.

The preview information acquisition module 410 is configured to acquire video call preview information of a first account before a video call module sends a video call connection request to a video call control apparatus; and the preview information processing module 420 is configured to perform a serialization operation on the video call preview information of the first account acquired by the preview information acquisition module 410.

Correspondingly, a preview information transceiver module 320 is further configured to send the video call preview information of the first account to the video call control apparatus.

In addition, the preview information processing module 420 is further configured to perform a deserialization operation on video call preview information of a second account received by the preview information transceiver module 320, and perform separate processing according to a different data type of the video call preview information of the second account.

Specifically, the preview information processing module 420 includes: a text processing unit 421, an image processing unit 422, an audio processing unit 423, and a video processing unit 424, which are respectively configured to process data in a text format, data in an image format, data in an audio format, and data in a video format.

For other details about the video call apparatus 400 in this embodiment, reference may further be made to FIG. 2 and related description.

In the video call apparatus in this embodiment, video call preview information of a first account is further acquired and sent to a video call control apparatus, and the video call control apparatus forwards the video call preview information of the first account to a second account, so that another user knows more about personality and interests of a user of the first account, thereby facilitating a more successful video call.

Figure 5:
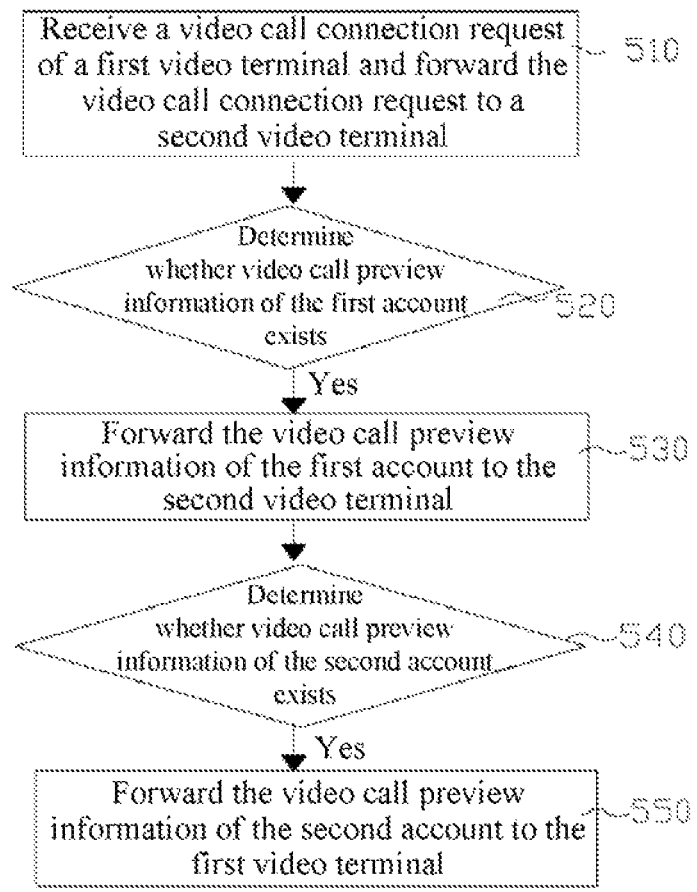
FIG. 5 is a flowchart of a video call control method provided by a fifth exemplary embodiment.

A fifth embodiment provides an exemplary video call control method, which may be executed by a video call control apparatus (a video call server). FIG. 5 illustrates the exemplary video call control method.

Step S510. A video call connection request of a first video terminal is received and forwarded to a second video terminal. For example, a first user logs in, on the first video terminal by using a first account, to the video call control apparatus and initiates the video call connection request by using the video call apparatus, and correspondingly, the video call control apparatus receives the video call connection request of the first video terminal. Next, the video call control apparatus queries login information of a second account, acquires a network address of the second video terminal associated with second account, and forwards the video call connection request to the second video terminal according to a predetermined video call protocol.

Step S520. It is determine whether video call preview information of the first account exists, where the video call preview information of the first account may be, for example, stored in a cloud storage server. Therefore, Step S520 may specifically include: querying, in a video call preview information database, whether there is the video call preview information of the first account; and performing, if the video call preview information of the first account is obtained, step S530; where otherwise, a procedure is the same as a general process of establishing a video call connection, details of which are not described herein again.

Step S530. The video call preview information of the first account is forwarded to the second video terminal.

Further, the video call control method in this embodiment may further include the following.

Step S540. It is determine whether video call preview information of the second account exists; and perform, if the video call preview information of the second account exists, step S550; where otherwise, a procedure is the same as a general process of establishing a video call connection.

Step S550. The video call preview information of the second account is forwarded to the first video terminal.

In the video call control method in this embodiment, while a video call connection request of a first account is forwarded to a second video terminal, video call preview information of the first account is further forwarded to the second video terminal, so that another user knows more about personality and interests of a user of the first account, thereby facilitating a more successful video call.

Figure 6:
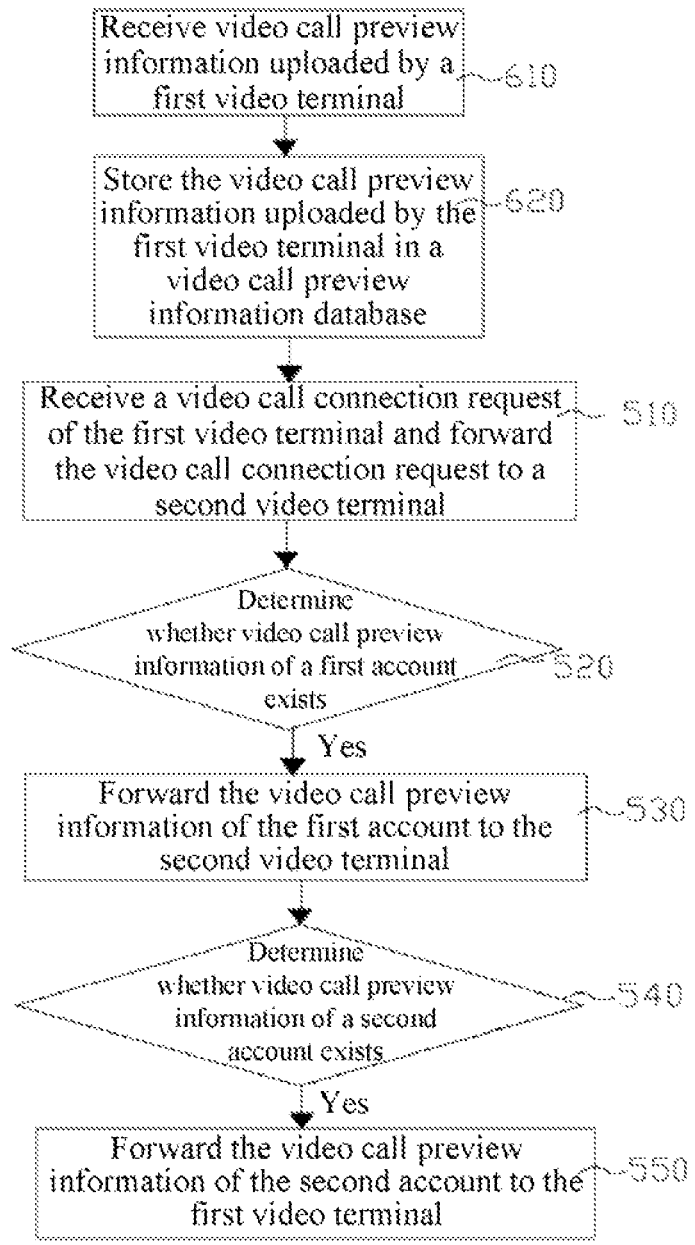
FIG. 6 is a flowchart of a video call control method provided by a sixth exemplary embodiment.

A sixth embodiment provides an exemplary video call control method as shown in FIG. 6, which is similar to the video call control method of the fifth embodiment as shown in FIG. 5, except that, in FIG. 6, before a video call connection request of a first account is received, the method further includes the following.

Step S610. Video call preview information uploaded by a first video terminal is received. As described above, the first video terminal completes, in an interface provided by a video call apparatus, customization of the video call preview information, the video call apparatus then uploads the video call preview information to a video call control apparatus, and correspondingly, the video call control apparatus receives the video call preview information uploaded by the first video terminal.

Step S620. The video call preview information uploaded by the first video terminal is stored in a video call preview information database.

It can be understood that besides video call preview information of a first account, similar processing may further be performed on a second account.

In the video call control method in this embodiment, video call preview information of a first account is stored, so that the preview information may be provided, in a subsequent process of establishing a video call connection for a second video terminal to preview, so that another user knows more about personality and interests of a user of the first account, thereby facilitating a more successful video call.

Figure 7:
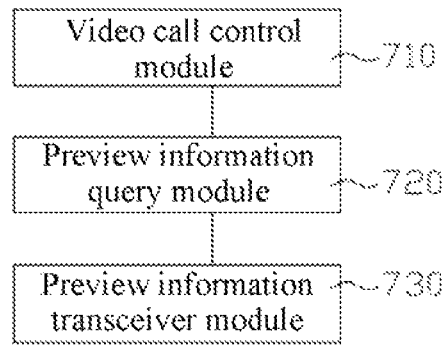
FIG. 7 is a flowchart of a video call control apparatus provided by a seventh exemplary embodiment.

A seventh embodiment provides an exemplary video call control apparatus. As shown in FIG. 7, the video call control apparatus includes a video call control module 710, a preview information query module 720, and a preview information transceiver module 730.

The video call control module 710 is configured to receive a video call connection request of a first video terminal, and forward the video call connection request to a second video terminal; the preview information query module 720 is configured to query whether video call preview information of a first account exists, for example, query, in a video call preview information database, whether there is the video call preview information of the first account; and the preview information transceiver module 730 is configured to forward, if it is determined that the video call preview information of the first account exists, the video call preview information of the first account to the second video terminal.

Further, the preview information query module 720 is configured to query whether video call preview information of a second account exists, and the preview information transceiver module 730 forwards, if it is determined that the video call preview information of the second account exists, the video call preview information of the second account to the first video terminal.

In the video call control apparatus in this embodiment, preview information of both parties of a video call may be separately and/or simultaneously transmitted to each other for displaying, so that both parties know more about each other, thereby facilitating a more successful video call.

Figure 8:
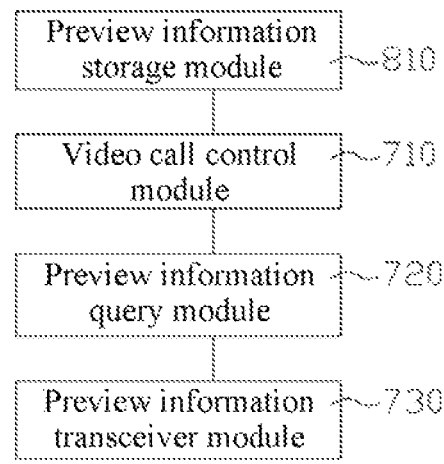
FIG. 8 is a flowchart of a video call control apparatus provided by an eighth embodiment.

An eighth embodiment provides an exemplary video call control apparatus as shown in FIG. 8, which is similar to the seventh embodiment as shown in FIG. 7, except that the video call control apparatus in FIG. 8 further includes a preview information storage module 810, configured to receive video call preview information uploaded by a first video terminal, and store the video call preview information uploaded by the first video terminal in a video call preview information database.

In the video call control apparatus in this embodiment, video call preview information of a first account is stored, and may be provided, in a subsequent process of establishing a video call connection, for a second video terminal to preview, so that another user knows more about personality and interests of a user of the first account, thereby facilitating a more successful video call.

An embodiment of the present invention further provides a video call system, including: a video call apparatus and a video call control apparatus.

The video call apparatus is configured to: enable a first video terminal associated with a first account to send a video call connection request to the video call control apparatus, so as to request to establish a video call connection with a second video terminal associated with a second account; enable the first video terminal to receive video call preview information of the second account returned by the video call control apparatus; and display, in a video call interface of the first video terminal, the video call preview information of the second account.

The video call control apparatus is configured to: receive the video call connection request of the first video terminal associated with the first account, and forward the video call connection request to the second video terminal associated with the second account; determine whether video call preview information of the first account exists; and forward, if it is determined that the video call preview information of the first account exists, the video call preview information of the first account to the second video terminal.

In addition, an embodiment of the present invention further provides one or more non-transitory computer-readable storage media, in which a computer-executable instruction is stored. The non-transitory computer-readable storage medium may be, for example, a non-volatile memory such as an optical disc, a hard disk, or a flash memory. The computer-executable instruction is used for a computer or a similar computing device to complete various operations in the foregoing video call method and video call control method. The video call method includes the following steps: sending, by a first video terminal associated with a first account, a video call connection request to a video call control apparatus, so as to request to establish a video call connection with a second video terminal associated with a second account; receiving, by the first video terminal, video call preview information of the second account returned by the video call control apparatus; and displaying, in a video call interface of the first video terminal, the video call preview information of the second account, while the video call connection is being established. The video call control method includes the following steps: receiving a video call connection request of a first video terminal associated with a first account, and forwarding the video call connection request to a second video terminal associated with a second account; determining whether video call preview information of the first account exists; and forwarding, if it is determined that the video call preview information of the first account exists, the video call preview information of the first account to the second video terminal.

In various embodiments, the disclosed video call apparatus and video call control apparatus may be configured in a computing device. For example, FIG. 9 illustrates an exemplary computing device capable of implementing the disclosed methods for video call and/or video call control consistent with the disclosed embodiments.

Figure 9:
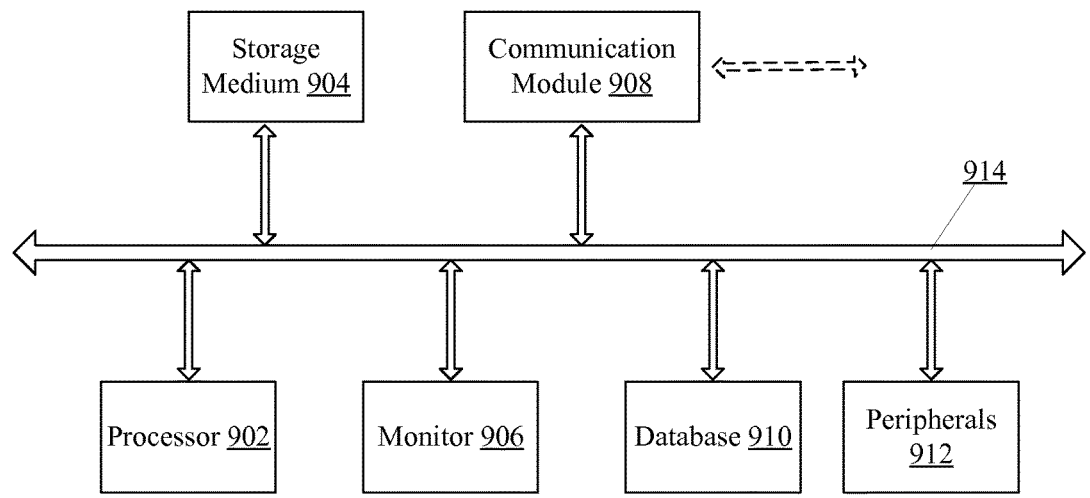
FIG. 9 illustrates an exemplary computing device consistent with the disclosed embodiments.

As shown in FIG. 9, the exemplary computing device 900 may include a processor 902, a storage medium 904, a monitor 906, a communication module 908, a database 910, peripherals 912, and one or more bus 914 to couple the devices together. Certain devices may be omitted and other devices may be included.

Processor 902 may include any appropriate processor or processors. Further, processor 902 may include multiple cores for multi-thread or parallel processing. The processor 902 may be used to run computer program(s) stored in the storage medium 904. Storage medium 904 may include memory modules, such as ROM, RAM, and flash memory modules, and mass storages, such as CD-ROM, U-disk, removable hard disk, etc. Storage medium 904 may store computer programs for implementing various disclosed methods (e.g., methods for updating IP geographic information), when executed by processor 902. In one embodiment, storage medium 904 may be a non-transitory computer-readable storage medium having a computer program stored thereon, when being executed, to cause the computer to implement the disclosed methods.

Further, peripherals 912 may include I/O devices such as keyboard and mouse, and communication module 908 may include network devices for establishing connections, e.g., through a communication network such as the Internet. Database 910 may include one or more databases for storing certain data and for performing certain operations on the stored data, such as webpage browsing, database searching, etc.

In various embodiments, the computing device may be a personal computer (PC), a work station computer, a server computer, a hand-held computing device (tablet), a smart phone or mobile phone, a car-carrying device, a server, or any other suitable computing device.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A video call method, comprising:
    sending, by a first video terminal associated with a first account, a video call connection request to a video call control apparatus, so as to request to establish a video call connection with a second video terminal associated with a second account;
    receiving, by the first video terminal, video call preview information of the second account returned by the video call control apparatus in response to the video call connection request; and
    displaying, in a video call interface of the first video terminal, the video call preview information of the second account, while the video call connection is being established;
    wherein: when the first video terminal established video call connection with the second video terminal in a previous time, historical data of the video call preview information of the second account acquired from the previous time is used to be displayed in the video call interface of the first video terminal, unless a user of the second account actively changes the video call preview information.

2. The video call method according to claim 1, wherein before the step of sending, by the first video terminal associated with the first account, the video call connection request to the video call control apparatus, the method further comprises:
    acquiring video call preview information of the first account;
    performing a serialization operation on the acquired video call preview information of the first account according to a requirement of network transmission; and
    sending the serialized video call preview information of the first account to the video call control apparatus.

3. The video call method according to claim 1, further comprising:
    performing a deserialization operation on the video call preview information of the second account returned by the control apparatus according to a requirement of network transmission, and
    performing separate processing according to a different data type of the video call preview information of the second account.

4. The video call method according to claim 1, wherein the first video terminal and the second video terminal run in a same host or run separately in different hosts.

5. The video call method according to claim 1, further comprising:
    receiving, by the second video terminal, video call preview information of the first account returned by the video call control apparatus in response to the video call connection request; and
    displaying, in a second video call interface, the video call preview information of the first account, while the video call connection is being established.

6. A video call apparatus, comprising:
    a video call module, configured to send a video call connection request to a video call control apparatus, so as to request to establish a video call connection with a second video terminal associated with a second account;
    a preview information transceiver module, configured to receive video call preview information of the second account returned by the video call control apparatus in response to the video call connection request; and a display module, configured to display, in a video call interface, the video call preview information of the second account, while the video call connection is being established;

wherein: when the video call apparatus established video call connection with the second video terminal in a previous time, historical data of the video call preview information of the second account acquired from the previous time is used to be displayed in the video call interface of the video call apparatus, unless a user of the second account actively changes the video call preview information.

7. The video call apparatus according to claim 6, further comprising:

a preview information acquisition module, configured to acquire video call preview information of a first account before the video call module sends the video call connection request to the video call control apparatus; and a preview information processing module, configured to perform a serialization operation on the video call preview information of the first account acquired by the preview information acquisition module according to a requirement of network transmission, where the preview information transceiver module is further configured to send the video call preview information of the first account to the video call control apparatus.

8. The video call apparatus according to claim 7, wherein the preview information processing module is further configured to perform a deserialization operation on the video call preview information of the second account received by the preview information transceiver module according to a requirement of network transmission, and perform separate processing according to a different data type of the video call preview information of the second account.

9. The video call apparatus according to claim 6, wherein the preview information processing module comprises: a text processing unit, an image processing unit, an audio processing unit, and a video processing unit, respectively configured to process data in a text format, data in an image format, data in an audio format, and data in a video format.

10. The video call system comprising the video call apparatus according to claim 6, wherein:

the system further comprises a video call control apparatus, and the video call control apparatus is configured to: receive the video call connection request of the video call apparatus associated with the first account, and forward the video call connection request to the second video terminal associated with the second account; determine whether video call preview information of the first account exists; and forward, when it is determined that the video call preview information of the first account exists, the video call preview information of the first account to the second video terminal.

11. A video call control apparatus, comprising:

a video call control module, configured to receive a video call connection request of a first video terminal associated with a first account, and forward the video call connection request to a second video terminal associated with a second account;

a preview information query module, configured to query whether video call preview information of the first account exists in response to the video call connection request; and a preview information transceiver module, configured to forward, if it is determined that the video call preview information of the first account exists, the video call preview information of the first account to the second account;

wherein: when the first video terminal established video call connection with the second video terminal in a previous time, historical data of the video call preview information of the second account acquired from the previous time is used to be displayed in the video call interface of the first video terminal, unless a user of the second account actively changes the video call preview information.

12. The video call control apparatus according to claim 11, wherein the preview information query module is further configured to: query whether video call preview information of the second account exists in response to the video call connection request; and the preview information transceiver module is further configured to forward, if it is determined that the video call preview information of the second account exists, the video call preview information of the second account to the first video terminal.

13. The video call control apparatus according to claim 11, wherein the preview information query module is further configured to query, in a video call preview information database, whether there is the video call preview information of the first account.

14. The video call control method according to claim 11, further comprising:

a preview information storage module, configured to receive the video call preview information uploaded by the first video terminal, and storing the video call preview information uploaded by the first video terminal in a video call preview information database.

15. The video call control apparatus according to claim 12, wherein:

the video call preview information of the first account and the video call preview information of the second account are separately transmitted to each other for displaying, while the video call connection is being established.

16. The video call system comprising the video call control apparatus according to claim 11, wherein the system further includes a video call apparatus, and wherein the video call apparatus is configured to: enable the first video terminal associated with the first account to send the video call connection request to the video call control apparatus, so as to request to establish a video call connection with the second video terminal associated with the second account; enable the first video terminal to receive video call preview information of the second account returned by the video call control apparatus; and display, in a video call interface of the first video terminal, the video call preview information of the second account, while the video call connection is being established.

17. The video call method according to claim 2, wherein: the video call preview information of the first account includes a text inputted by a user of the first account.

18. The video call method according to claim 2, wherein: the video call preview information of the first account includes an image, an audio, or a video from content stored in a host where the first video terminal runs, and content stored in a network.

19. The video call method according to claim 2, wherein: the video call preview information of the first account includes an image, an audio, or a video from content obtained through real-time recording with a camera or a microphone of a host of the first video terminal.

* * * * *